United States Patent
Sirat et al.

[11] Patent Number: 5,953,137
[45] Date of Patent: Sep. 14, 1999

[54] LINEAR CONOSCOPIC HOLOGRAPHY

[75] Inventors: Gabriel Y. Sirat, Rehovot; Jacob Vecht, Jerusalem, both of Israel; Yann Malet, Saint-Cyr l'Ecole, France

[73] Assignee: Optimet, Optical Metrology Ltd., Jerusalem, Israel

[21] Appl. No.: 08/942,379

[22] Filed: Oct. 1, 1997

Related U.S. Application Data

[60] Provisional application No. 60/028,245, Oct. 9, 1996.

[51] Int. Cl.$^6$ .............................. G03H 1/00; G03H 1/04; G02B 5/30
[52] U.S. Cl. .............................. 359/30; 359/35; 359/497; 359/494
[58] Field of Search .............................. 359/1, 494, 495, 359/29, 30, 35, 497

[56] References Cited

U.S. PATENT DOCUMENTS

| | | | |
|---|---|---|---|
| 4,602,844 | 7/1986 | Sirat et al. | 350/3.83 |
| 4,976,504 | 12/1990 | Sirat et al. | 359/29 |
| 5,081,540 | 1/1992 | Dufresne et al. | 359/30 |
| 5,521,695 | 5/1996 | Cathey, Jr. et al. | 356/4.01 |

OTHER PUBLICATIONS

Sirat, Gabriel Y., "Conoscopic holography. I. Basic principles and physical basis", J. Opt. Soc. Am. A/vol. 9, No. 1, Jan. 1992, pp. 70–83.

Sirat, Gabriel Y., "Conoscopic holograph. II. Rigorous derivation", J. Opt. Soc. Am. A/vol. 9, No. 1, Jan. 1992, pp. 84–90.

*Primary Examiner*—Cassandra Spyrou
*Assistant Examiner*—Jared Treas
*Attorney, Agent, or Firm*—Bromberg & Sunstein LLP

[57] ABSTRACT

A linear conoscope producing a conoscopic interferogram of an object wherein the phase shift giving rise to the interferogram is substantially linearly dependent on displacement of an object from a geometrical axis. Two anisotropic optical elements are provided and oriented with respect to one another in such a manner as to cancel the predominant term in which the phase shift depends quadratically on displacement from the geometrical axis.

10 Claims, 6 Drawing Sheets

LINEAR CONOSCOPIC HOLOGRAPHY

The present application claims priority from U.S. provisional application Ser. No. 60/028,245, filed Oct. 9, 1996, which is herein incorporated by reference

TECHNICAL FIELD

The present invention relates to optical metrology, and, in particular, to interferometric metrology employing a single beam.

BACKGROUND ART

In ordinary holography, coherent light emanating from a source region is caused to interfere with a coherent reference beam in order to construct an interferogram in which the three-dimensional characteristics of the source region are encoded. Conoscopy is a distinct interferometric technique capable of determining the distance to a point within an object volume without employing a reference beam. Instead, light emanating from a source region is prepared in a defined state of polarization and then passed through an anisotropic optical element in which one polarization suffers phase retardation with respect to the other. The two polarization components emerging from the anisotropic optical element interfere with one another, producing a interferogram in the detector plane. The interferogram can be recorded using various means, the most useful being an electronic detector array such as a charge-coupled device (CCD) camera. The electronic image of the interferogram may then be deconvolved to determine the three-dimensional locus of the origin of the light. Conoscopy, thus, requires only a single camera for determining object contour. Furthermore, the source of illumination is not required to be coherent.

Conoscopy is the subject of various patents, including U.S. Pat. Nos. 4,602,844, 4,976,504, 5,081,540, and 5,081,541. Several embodiments have been taught which differ in the method of illuminating the object volume. The light which emanates from the source region may be actively provided, such as by a scanned beam, in which case additional information regarding the position of illumination at a particular time is available for deriving from the conoscopic interferogram the precise three-dimensional profile of the source region. Alternatively, a passive technique exists, referred to in the art as "conoscopic holography," in which diffuse light is used. In the latter case, no additional information is available and the deconvolution of the conoscopic image is significantly more computationally complex. The source region may be illuminated with a narrow beam, providing the conoscopic interferometer with, essentially, a point source in the object volume. A system employing this mode of operation is referred to as a conoscopic "probe." Alternatively, the source region may be illuminated with a grid (or "cloud") of points, or with a line. A system employing a line of illumination is referred to as a conoscopic "profilometer."

Figure 1:
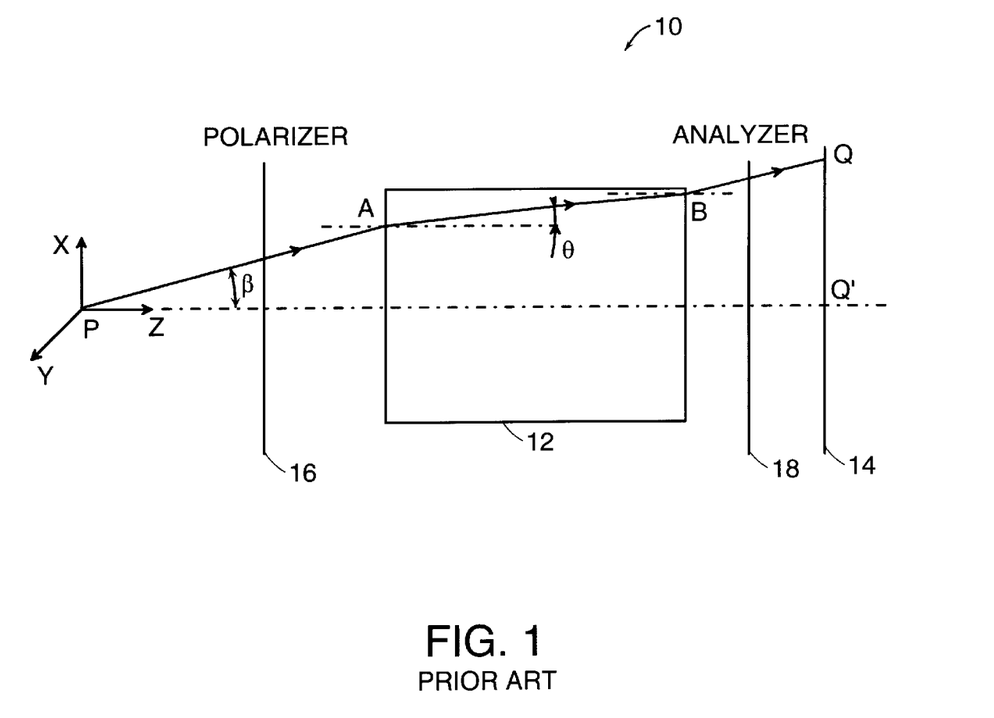
FIG. 1 is a schematic representation of a prior art conoscopic apparatus having quadratic fringes.

Common to the modes in which conoscopy is employed is a uniaxial crystal, which exhibits different indices of refraction (and, as such, is birefringent) for components of light polarized in directions parallel or normal to a particular axis referred to as the crystal's extraordinary axis. The prior conoscopic art may be understood by reference to FIG. 1. As shown in FIG. 1, light emanating from a point P in the object region is circularly polarized by polarizer 16, introducing a 90° phase shift between the two polarization components. The phase components are differentially delayed in uniaxial crystal 14, and then analyzed by means of polarization analyzer 18, which is circular polarizer. Other embodiments are known in the art in which one or both of the polarizer 16 and the polarization analyzer 18 is replaced by a linear polarizer. These embodiments are described in U.S. Pat. Nos. 4,602,844 and 4,976,504, which are incorporated herein by reference. The overlay of polarization components gives rise to the cylindrically symmetric pattern known as a Gabor Zone Lens (GZL), shown in FIG. 2. The projection of the cylindrical interference pattern on detector plane 14 has, essentially, a quadratic dependence on distance from the center of the GZL, for reasons discussed in detail by G. Sirat, *Conoscopic Holography: Part I, Basic Principles and Physical Basis,* Journal of the Optical Society of America A, 9:84 (1992), which is hereby incorporated by reference.

Sirat teaches that the response of the recording means in the detector plane is proportional to the modulus of the impinging light intensity, where the light amplitudes are expressed as complex values. In the language of quantum optics, the recording means is referred to as a "square-law" detector. As a consequence, the interference term, i.e., the term of the detector response which is sensitive to the relative phase of the interfering polarization components, is proportional to the cosine of $\Delta\phi$, where $\Delta\phi$ is the difference in the phase of the light between the polarization components emanating from a single point in the object volume.

Terms relevant to both the prior art and the current invention are defined with reference to FIG. 1 which is a simplified depiction of a prior art conoscope, designated generally by numeral 10. The axis (not shown) of anisotropic crystal 12 having the highest degree of rotational symmetry is referred to, conventionally, as the "optical axis" of the crystal, and in the simplified "on-axis" case depicted in FIG. 1, is assumed to coincide with the geometrical axis z of the system. Light emanating from point P of the source region passes through crystal 12 with the phase difference $\Delta\phi$ of one polarization with respect to the other given, for light reaching detector plane 14 at point Q by:

$$\Delta\phi = (\pi\kappa_O)\, r^2/z_c^2,$$

where:

r is the lateral displacement in detector plane 14 of point Q from the geometrical axis z whose intersection with detector plane 14 is designated Q';

$\kappa_O$ is the unitless conoscopic parameter defined in equation A-13 of Sirat; and $z_c$ is the conoscopic corrected distance, defined in equation A-8 of Sirat, which can be converted to the actual distance between conoscope 10 and object point P by knowledge of system parameters, as taught by Sirat, or by calibration means known in the art.

Additionally, if the optic axis of crystal 12 is displaced with respect to the geometrical axis of the system by an angle, referred to as the "off-axis angle," $\theta_{OFF}$, taken, without loss of generality, to be in the direction of the x axis, then the phase difference $\Delta\phi$ is given by:

$$\Delta\phi = (\pi\kappa_O)\, ((x-x_O-\theta_{OFF}z_c)^2 + (y-y_O)^2)/z_c^2,$$

where $x_O$ and $y_O$ refer to the coordinates of the geometric axis in detector plane 14.

In either the on-axis or more general case, it can be seen that the phase difference $\Delta\phi$ depends quadratically on the displacement of detector point Q from the geometric axis, and, more particularly, depends quadratically on the displacement of detector point Q from the geometric axis along a particular direction in the detector plane. This behavior is referred to as a "quadratic fringe," and is illustrated by the inteferogram shown in FIG. 2. The resulting pattern of annular interference fringes is referred to as a Gabor Lens Zone interferogram.

In practical applications of conoscopy, which include quality inspection in the production of precision components, speed and precision requirements suggest the advantages of replacing the known quadratic, or parabolic, dependence of the interference pattern on distance from the center of the GZL with a linear fringe fundamental response. In the prior art quadratic case, determination of the distance to the object point requires simultaneous determination of two parameters: the centroid and coefficient of the parabola. The measurement is correspondingly less accurate, for a given exposure, than in the linear case, where the same measurement requires algorithmic determination of the slope alone. Additionally, deconvolution of the interferogram in the known quadratic case requires specialized, and necessarily more complex and time-consuming, computational algorithms. Additionally, the quadratic dependence introduces an aberration due to the orientation of the extraordinary axis of the birefringent medium in each of the two orthogonal planes containing the optical axis of the system. This phenomenon effectively reduces the useful numerical aperture of the system, and, consequently, limits the light flux which can be captured in the detector plane, and increases the time required for a specified level of measurement accuracy.

SUMMARY OF THE INVENTION

The present invention provides, in one embodiment, a linear conoscope, having a geometrical axis, for producing a conoscopic interferogram of an object. The conoscopic interferogram occurs in a detector plane perpendicular to the geometrical axis and has an amplitude substantially linearly dependent on displacement from the geometrical axis. The linear conoscope has a first anisotropic optical element having an optic axis such that the optic axis of the first anisotropic element and the geometrical axis of the linear conoscope form a first rotation angle and define a fiducial plane. The first anisotropic element has an extraordinary axis within a plane perpendicular to the optic axis of the first anisotropic element. The invention also provides a second anisotropic optical element with an optic axis. The second anisotropic optical element is coupled to the first anisotropic optical element such that the optic axis of the second anisotropic optical element forms an angle within the fiducial plane, the angle assuming a value substantially equal in value and opposite in sign to the first rotation angle. The extraordinary axis of the second anisotropic optical element is substantially parallel to the extraordinary axis of the first anisotropic optical element. The linear conoscope also has a polarization analyzer inserted between the second anisotropic optical element and the detector plane.

In further embodiments, a polarizer, which may be a circular polarizer, is inserted between the first optical element and the object. The linear conoscope, in yet another embodiment, may have a source of linearly polarized light for illuminating the object. Additional elements which the linear conoscope may have in other embodiments include a detector array for receiving the interferogram in the detector plane and a signal processor, which may be a digital signal processor, for deriving from the interferogram the distance between the surface of the object and a fiducial position on the apparatus.

Another embodiment of the invention provides a linear conoscope which has only a single anisotropic optical element with a large off-axis angle such that the phase shift of one polarization of light with respect to an orthogonal polarization is dominated by a linear term.

BRIEF DESCRIPTION OF THE DRAWINGS

The foregoing features of the invention will be more readily understood by reference to the following detailed description taken with the accompanying drawings, in which.

DETAILED DESCRIPTION OF SPECIFIC EMBODIMENTS

A preferred embodiment of the invention is now described with reference to FIG. 3 wherein a diagram shows the optical layout of a linear conoscope, designated generally by numeral 20. Linear conoscope 20 is used in conjunction with an object 22, particularly for the purpose of measuring distance 24 between linear conoscope 20 and a particular object point 26 on the surface of object 22. More generally, object 22 may be any scene or the image of any scene through any optical system. A first anisotropic optical element 30 and a second anisotropic element 32 are configured with respect to object 22 so that light emanating form the surface of object 22 passes through both anisotropic optical elements 30 and 32.

The light emanating from the surface of object 22 must be prepared in a definite state of polarization so that linear conoscope 20 will operate to delay one component of polarization with respect to another. The polarization may be provided by means of illuminating object 22 with polarized light, or, alternatively, by interposing a polarizer, of any sort known in the art, between object 22 and linear conoscope 20. Both anisotropic optical elements 30 and 32 are composed of a transparent crystalline material which has the property that the index of refraction of the material differs for light polarized in different orientations with respect to the normal axes of the crystal. As is well-known in the art of optics, crystalline materials which may be used include, by way of example, calcite, lithium niobate, $YVO_4$, and $\beta$-BBO. While anisotropic optical elements 30 and 32 may be composed of different materials, it is preferred that identical materials be used to avoid aberrations due to higher-order non-linear optical effects. U.S. Pat. No. 4,602,844, incorporated herein by reference, describes the use of optical activity as an alternative to birefringence to provide the requisite optical anisotropy. It is also advantageous, in some circumstances, to employ a larger number of anisotropic elements, in order to cancel aberrations.

Linear fringe response is achieved by cancellation of the quadratic term in the expression, above, for net phase difference, $\Delta\phi$. In the preferred embodiment, this is accomplished by double rotation of the two anisotropic optical elements, 30 and 32. In the present description, z refers to the direction defined by the geometrical axis of the optical system. Double rotation refers to displacement of the optic axis $z_1'$, $z_2'$ of an anisotropic optical element by a polar angle $\alpha$ away from z, and then by a subsequent rotation of the minor principal axes of the anisotropic optical element about the major principal axis by an azimuthal angle $\beta$. The polar and azimuthal angles through which first anisotropic optical element 30 is rotated are referred to as $\alpha_1$ and $\beta_1$. The polar and azimuthal angles through which second anisotropic optical element 32 is rotated are referred to as $\alpha_2$ and $\beta_2$. The optic axis of first anisotropic optical element 30 and the geometrical axis of the system are, together, taken to define a fiducial plane 42, in terms of which the first rotation of the second anisotropic optical element may be defined.

In order to provide cancellation of the quadratic phase shift terms, anisotropic optical elements, 30 and 32 are each double rotated such that the respective first rotations are equal and opposite, $\alpha_1=\alpha_2$, while the second rotations are of equal magnitude, $|\beta_1|=|\beta_2|$. Thus, the ordinary or extraordinary axis $z_2'$ of the second anisotropic optical element 32 is shifted by $\pi$ radians relative to the first anisotropic optical element 30. The absolute magnitude of $\alpha_1$ (I=1 or 2) is typically in the range between 0° (on-axis operation) and 20°. Double rotation, as described, cancels the quadratic term in the expression for phase difference $\Delta\phi$ and produces linear fringes, when $\alpha$ is approximately equal to $\beta$, however $\beta$ may typically range between half and twice $\alpha$.

Additionally, a field stop 40 is provided directly in the optical path or in auxiliary optics, as is well known to persons skilled in the art, so as to define an etendue over which the operation of linear conoscope remains linear. The numerical aperture of the system is typically on the order of 0.1 rad.

Opposing faces of anisotropic optical elements, 30 and 32 are coupled to each other in a manner which prevents spurious reflection of light, as is well known in the optical art. Means for achieving such coupling include air-spacing of the optical elements, with anti-reflective coatings applied to the surfaces of the optical elements, as known in the art. Other means for coupling the optical elements include bonding the optical elements with index-matching glue, and the use of glue with additional anti-reflective treatment of the opposing surfaces.

Operation of linear conoscope 20 in the linear mode, as has been described, provides fringes in detector plane 14, such that the phase difference $\Delta\phi$ depends linearly on the distance from the optical axis, as measured along one of the axes, taken, without loss of generality, as x. The optical fringes are converted by detector array 15 to a sequence of electronic signals for subsequent image processing. More particularly, phase difference $\Delta\phi$ may be expressed as:

$$\Delta\phi=(\pi\kappa_1)(2\theta_{OFF}(x-x_O)/z_C)+\theta_{OFF}^2,$$

where $\kappa_1$ is a linear conoscopic constant, determined by system parameters, and other variables are as defined above. Thus, the interference pattern due to a point source object is now a cosine of x, designated by numeral 50, shown in FIG. 4. The conoscopic distance $Z_c$, and, thus, the actual distance from linear conoscope 20 to illuminated point P, may now be determined solely from the period of the cosine 50. The period of a cosine is readily determined using commonly used algorithms and digital signal processors 16 (shown in FIG. 3).

Referring again to FIG. 3, in an alternative embodiment of the invention, an in-situ reference 70 is provided, illuminated by the same illuminating source as illuminates object 22 In-situ reference point 70 is coupled to linear conoscope 20 at a fixed position in the field so that the interferogram of the point is recorded by the system in the same way as the interferogram corresponding to object point 26, and the distance to point 70 is computed. The interferogram of point 70 may either be recorded on a separate portion of detector array 15 or recorded on the same part of detector array 15 with a spatial frequency 52 (shown in FIG. 4) being sensibly different from that of the object interferogram by virtue of the distinct depth separation of reference point 70 from object point 26. Thus, the interferograms due to reference point 70 and object point 26 may either be separated by appropriate signal processing, using algorithms well known to persons skilled in the art, or else recorded sequentially. In either case, the interferogram due to reference point 70 serves as a calibrator for linear conoscope 20, and the drift, temperature dependence or other changes in system calibration may be corrected in subsequent signal processing.

Figure 5:
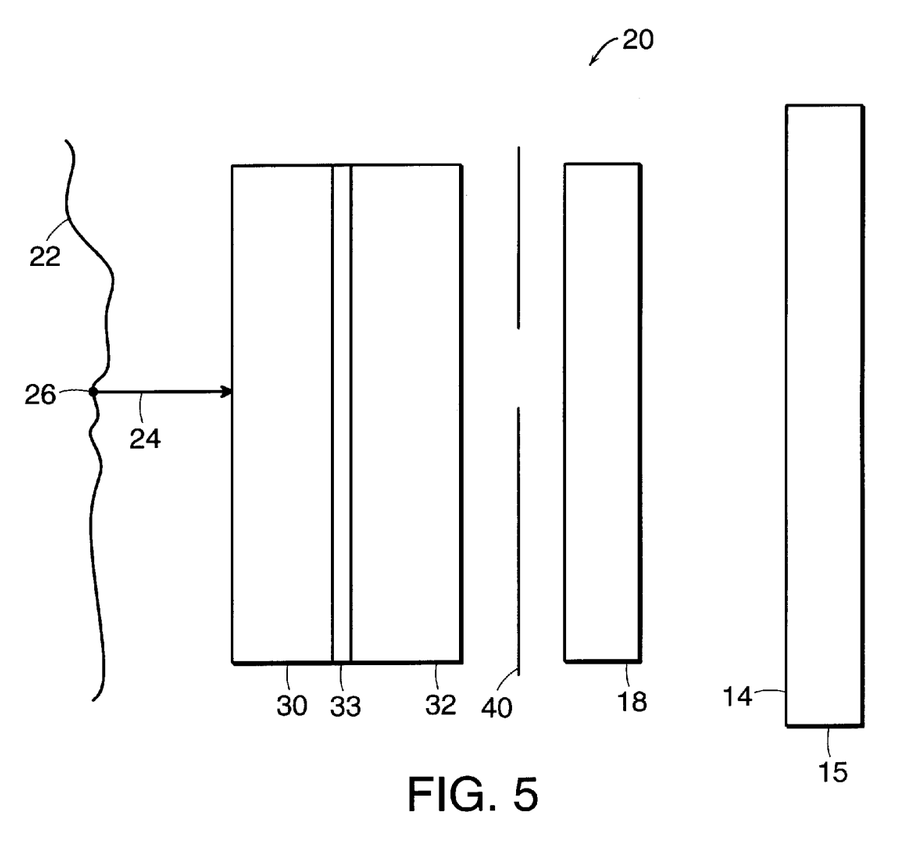
FIG. 5 is a diagram showing the optical layout of an alternative embodiment of the present invention having an alternate relative orientation of the anisotropic elements.

In an alternate embodiment of the invention, described with reference to FIG. 5, anisotropic optical elements 30 and 32 are oriented such that off-axis angle $\theta_{OFF}$ of anisotropic optical element 30 is positive and off-axis angle $\theta_{OFF}$ of anisotropic optical element 32 is negative. In order for the quadratic terms to cancel and for the linear terms to contribute additively, a half-wave plate 33 is introduced in the optical path, between anisotropic optical elements 30 and 32 so as to provide a 90° shift and sign reversal in the polarization of the incident light relative to the direction defined by $\theta_{OFF}$ with respect to the geometrical axis.

Figure 6:
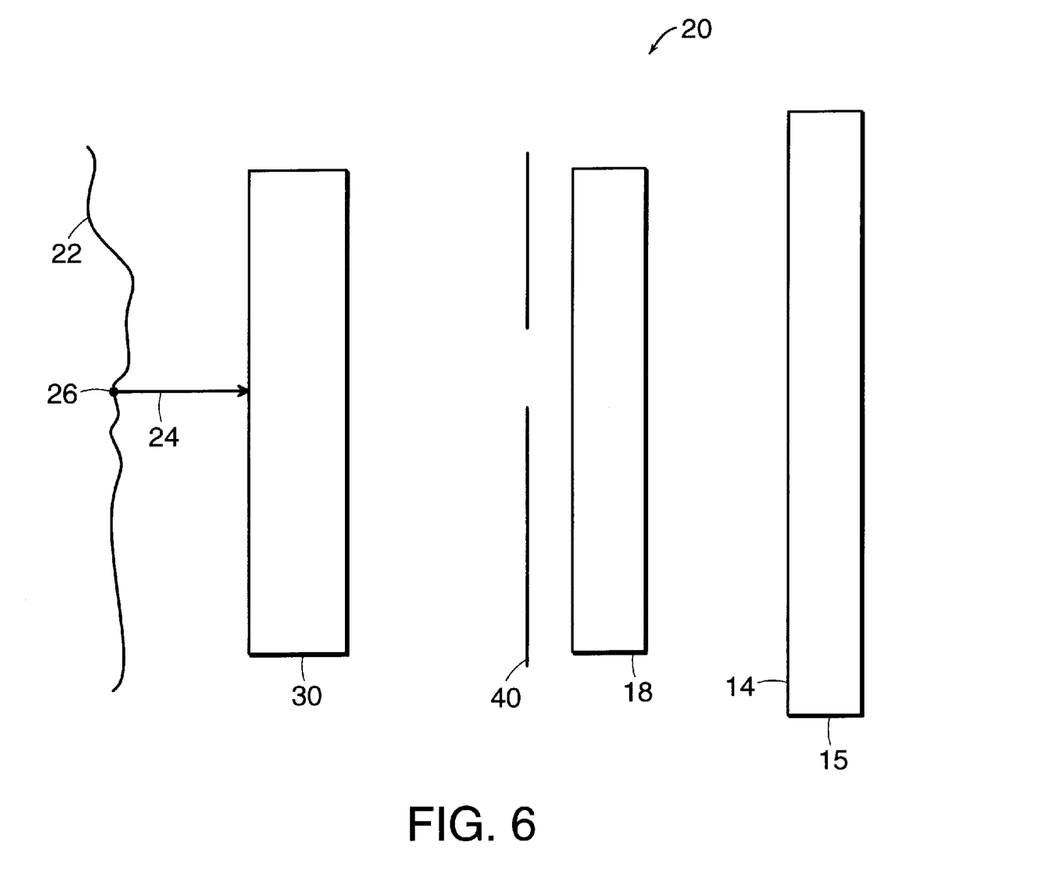
FIG. 6 is a diagram showing the optical layout of an alternative embodiment of the present invention having an anisotropic element with a large off-axis angle.

Referring now to FIG. 6, in a further alternate embodiment, the linear contribution to phase difference $\Delta\phi$ is caused to dominate at detector plane 14 by using a single anisotropic optical element 30 positioned such that optic axis z' is canted from geometrical axis z by a large off-axis angle $\theta_{off}$. More particularly, for a single-crystal embodiment of the linear conoscope, the off-axis angle must be, typically, at least five times as large as the cone subtended within the crystal, which is on the order of 0.1 radian, or ~7°.

Referring, again, to FIG. 3, the present invention, in any of the embodiments which have been described, may employ an areal detector array 15 in detector plane 14, in conjunction with laser illumination of a line on the object surface 22 transverse to a fiducial plane. Auxiliary optics (not shown) are used, as well known to a person skilled in the art, to image the illuminated line onto detector array 15 so that each row of detector 15 sees a single point of the line. Areal detector array may be read out and analyzed to provide the depths, or profile, of the entire line on the object surface.

The described embodiments of the inventions are intended to be merely exemplary and numerous variations and modifications will be apparent to those skilled in the art. All such variations and modifications are intended to be within the scope of the present invention as defined in the appended claims.

What is claimed is:

1. A linear conoscope, having a geometrical axis, for producing a conoscopic interferogram of an object, the conoscopic interferogram occurring in a detector plane perpendicular to the geometrical axis and having an amplitude substantially linearly dependent on displacement from the geometrical axis, the linear conoscope comprising:

(a) a first anisotropic optical element having an optic axis such that the optical axis of the first anisotropic element and the geometrical axis of the linear conoscope form a first rotation angle and a fiducial plane, the first anisotropic optical element further having an extraordinary axis within a plane perpendicular to the optic axis of the first anisotropic element;

(b) a second anisotropic optical element, having a optic axis, the second anisotropic optical element being coupled to the first anisotropic optical element such that the optic axis of the second anisotropic optical element forms an angle within the fiducial plane, said angle assuming a value substantially equal in value and opposite in sign to the first rotation angle, the second anisotropic optical element further having an extraordinary axis substantially parallel to the extraordinary axis of the first anisotropic optical element; and (c) a polarization analyzer inserted between the second anisotropic optical element and the detector plane.

2. A linear conoscope according to claim 1 further comprising a polarizer inserted between the first anisotropic optical element and the object.

3. A linear conoscope according to claim 2 wherein the polarizer is a circular polarizer.

4. A linear conoscope according to claim 1 further comprising a source of linearly polarized light for illuminating the object.

5. A linear conoscope according to claim 1 further comprising a detector array for receiving the interferogram at the detector plane.

6. A linear conoscope according to claim 5 further comprising a signal processor for deriving from the interferogram the distance between the linear conoscope and the object.

7. A linear conoscope according to claim 1 further comprising an in-situ reference for establishing a distance scale, the in-situ reference comprising a material reference point disposed between the first anisotropic element and the object.

8. A linear conoscope according to claim 6 wherein the signal processor is a digital signal processor.

9. A linear conoscope, having a geometrical axis, for producing a conoscopic interferogram of an object, the conoscopic interferogram occurring in a detector plane perpendicular to a geometrical axis and having an amplitude substantially linearly dependent on displacement from the geometrical axis, the linear conoscope comprising:

(a) an anisotropic optical element having a field of view characterized by a cone subtended within the anisotropic optical element, and having an optical axis such that the optical axis of the anisotropic element and the geometrical axis of the linear conoscope form an off-axis angle, the off-axis angle having a measure larger than fives times as large as the cone subtended within the anisotropic optical element characterizing the field of view; and (b) a polarization analyzer inserted between the anisotropic optical element and the detector plane.

10. A linear conoscope, having a geometrical axis, for producing a conoscopic interferogram of an object, the conoscopic interferogram occurring in a detector plane perpendicular to the geometrical axis and having an amplitude substantially linearly dependent on displacement from the geometrical axis, the linear conoscope comprising:

(a) a first anisotropic optical element having a first optic axis;

(b) a second anisotropic optical element, having a second optic axis, the second optic axis oriented with respect to the first optic axis in such a manner as to provide cancellation of a quadratic dependence of the amplitude of the interferogram on displacement from the geometrical axis; and (c) a polarization analyzer inserted between the second anisotropic optical element and the detector plane.

* * * * *

UNITED STATES PATENT AND TRADEMARK OFFICE
CERTIFICATE OF CORRECTION

Page 1 of 5

PATENT NO. : 5,953,137
DATED : September 14, 1999
INVENTOR(S) : Sirat et al.

It is certified that error appears in the above-identified patent and that said Letters Patent is hereby corrected as shown below:

The title page, showing an illustrative figure, should be deleted and substitute therefor the attached title page.

Figure 2:
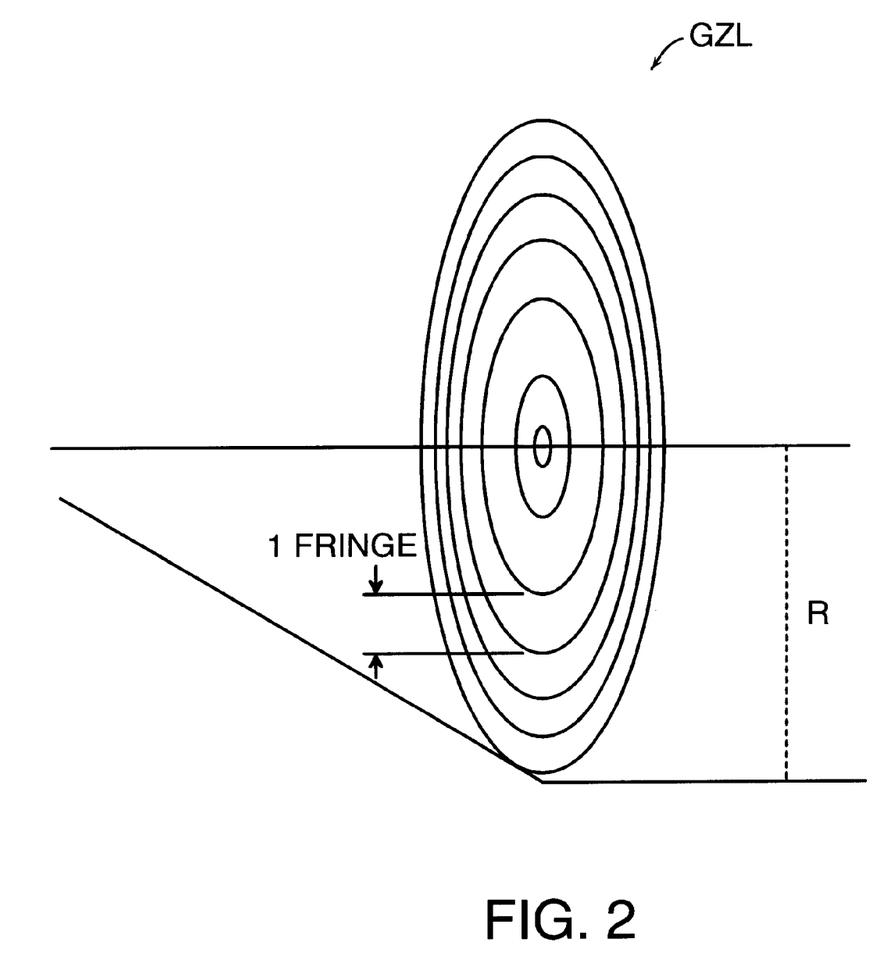
FIG. 2 shows the concentric annular interference fringes of a Gabor Lens Zone interferogram provided by the prior art conoscopic apparatus of FIG. 1.
Figure 3:
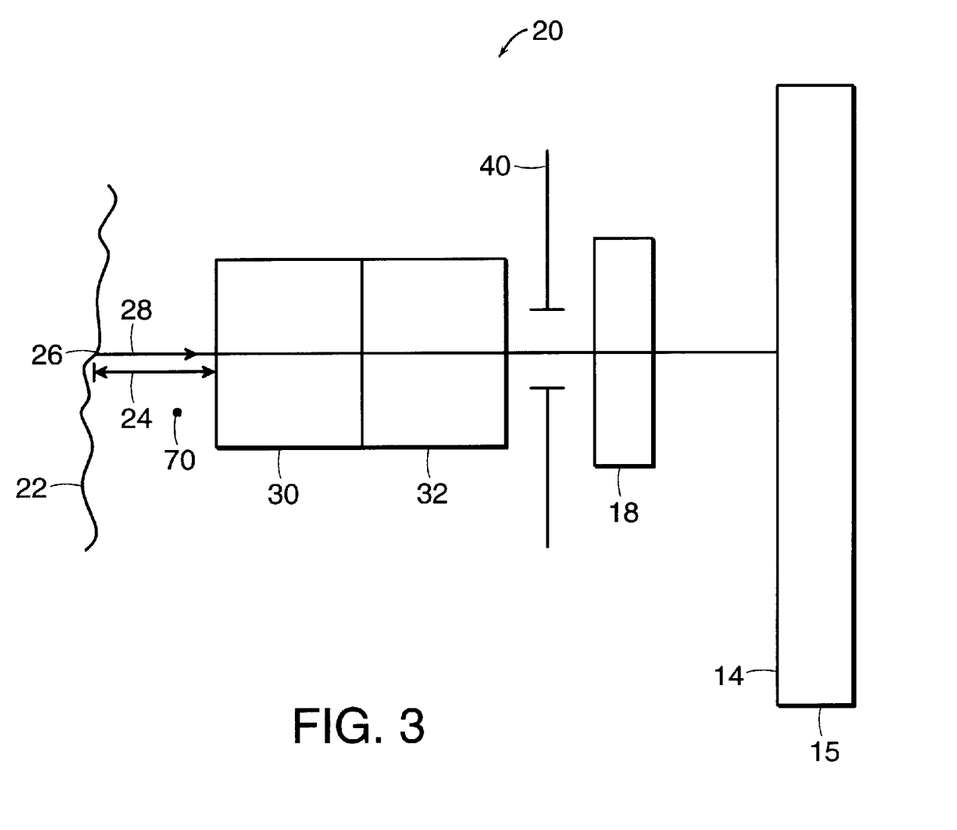
FIG. 3 is a diagram showing the optical layout of a linear conoscope in accordance with a preferred embodiment of the present invention.
Figure 4:
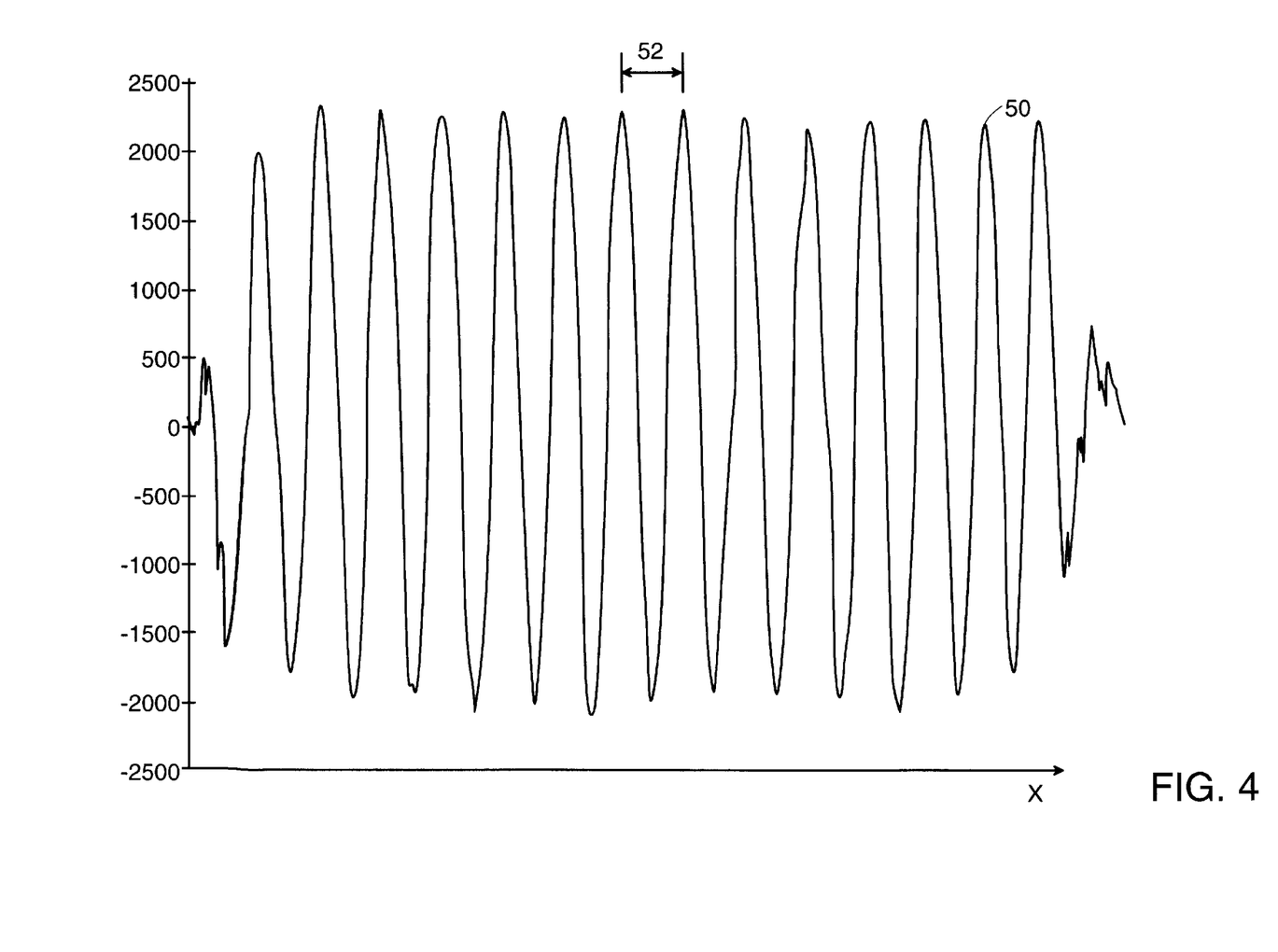
FIG. 4 is a plot of the intensity pattern of an interferogram obtained using the linear conoscope of FIG. 3.

Delete Drawing sheet (s) 2-4, consisting of Figs. 2, 3, and 4, as shown on the attached pages.

Signed and Sealed this

Twenty-fourth Day of October, 2000

Attest:

Q. TODD DICKINSON

*Attesting Officer*          *Director of Patents and Trademarks*

United States Patent [19]
Sirat et al.

[11] Patent Number: 5,953,137
[45] Date of Patent: Sep. 14, 1999

[54] LINEAR CONOSCOPIC HOLOGRAPHY

[75] Inventors: Gabriel Y. Sirat, Rehovot; Jacob Vecht, Jerusalem, both of Israel; Yann Malet, Saint-Cyr l'Ecole, France

[73] Assignee: Optimet, Optical Metrology Ltd., Jerusalem, Israel

[21] Appl. No.: 08/942,379

[22] Filed: Oct. 1, 1997

Related U.S. Application Data

[60] Provisional application No. 60/028,245, Oct. 9, 1996.

[51] Int. Cl.⁶ .................... G03H 1/00; G03H 1/04; G02B 5/30
[52] U.S. Cl. .................... 359/30; 359/35; 359/497; 359/494
[58] Field of Search .................... 359/1, 494, 495, 359/29, 30, 35, 497

[56] References Cited

U.S. PATENT DOCUMENTS

| | | | |
|---|---|---|---|
| 4,602,844 | 7/1986 | Sirat et al. | 350/3.83 |
| 4,976,504 | 12/1990 | Sirat et al. | 359/29 |
| 5,081,540 | 1/1992 | Dufresne et al. | 359/30 |
| 5,521,695 | 5/1996 | Cathey, Jr. et al. | 356/4.01 |

OTHER PUBLICATIONS

Sirat, Gabriel Y., "Conoscopic holography. I. Basic principles and physical basis", J. Opt. Soc. Am. A/vol. 9, No. 1, Jan. 1992, pp. 70–83.

Sirat, Gabriel Y., "Conoscopic holograph. II. Rigorous derivation", J. Opt. Soc. Am. A/vol. 9, No. 1, Jan. 1992, pp. 84–90.

*Primary Examiner*—Cassandra Spyrou
*Assistant Examiner*—Jared Treas
*Attorney, Agent, or Firm*—Bromberg & Sunstein LLP

[57] ABSTRACT

A linear conoscope producing a conoscopic interferogram of an object wherein the phase shift giving rise to the interferogram is substantially linearly dependent on displacement of an object from a geometrical axis. Two anisotropic optical elements are provided and oriented with respect to one another in such a manner as to cancel the predominant term in which the phase shift depends quadratically on displacement from the geometrical axis.

10 Claims, 6 Drawing Sheets

UNITED STATES PATENT AND TRADEMARK OFFICE
CERTIFICATE OF CORRECTION

PATENT NO. : 5,953,137
DATED : September 14, 1999
INVENTOR(S) : Sirat et al.

It is certified that error appears in the above-identified patent and that said Letters Patent is hereby corrected as shown below:

FIG. 2
PRIOR ART

UNITED STATES PATENT AND TRADEMARK OFFICE
CERTIFICATE OF CORRECTION

PATENT NO. : 5,953,137
DATED : September 14, 1999
INVENTOR(S) : Sirat et al.

It is certified that error appears in the above-identified patent and that said Letters Patent is hereby corrected as shown below:

FIG. 3

UNITED STATES PATENT AND TRADEMARK OFFICE
CERTIFICATE OF CORRECTION

PATENT NO. : 5,953,137

DATED : September 14, 1999

INVENTOR(S) : Sirat et al.

It is certified that error appears in the above-identified patent and that said Letters Patent is hereby corrected as shown below:

FIG. 4